(12) United States Patent
Dawson et al.

(10) Patent No.: US 10,625,537 B1
(45) Date of Patent: Apr. 21, 2020

(54) DRY ERASE BOARD SYSTEM AND METHOD OF USE

(71) Applicants: Dony Dawson, Fort Worth, TX (US); Keven Kirk, Boyd, TX (US)

(72) Inventors: Dony Dawson, Fort Worth, TX (US); Keven Kirk, Boyd, TX (US)

( * ) Notice: Subject to any disclaimer, the term of this patent is extended or adjusted under 35 U.S.C. 154(b) by 322 days.

(21) Appl. No.: 15/467,468

(22) Filed: Mar. 23, 2017

(51) Int. Cl.
*G09F 15/00* (2006.01)
*B43L 1/00* (2006.01)
*G09B 19/00* (2006.01)

(52) U.S. Cl.
CPC ............ *B43L 1/00* (2013.01); *G09F 15/00* (2013.01); *G09F 15/0056* (2013.01); *G09F 15/0068* (2013.01); *G09B 19/00* (2013.01)

(58) Field of Classification Search
None
See application file for complete search history.

(56) References Cited

U.S. PATENT DOCUMENTS

| | | | | |
|---|---|---|---|---|
| 1,661,003 A * | 2/1928 | Miller | .................... | A47G 5/00 16/354 |
| 3,428,108 A * | 2/1969 | Singer | .................... | E04B 2/7431 160/135 |
| 3,610,249 A * | 10/1971 | Baker | .................... | E04H 15/003 16/265 |
| 3,810,330 A * | 5/1974 | Daggy | .................... | E05D 15/58 49/127 |
| 4,118,903 A * | 10/1978 | Coulthard | .............. | A47B 57/26 108/152 |
| 4,200,254 A * | 4/1980 | Nelson | .................. | E04B 2/7405 160/351 |
| 4,457,117 A * | 7/1984 | Leiher | .................. | E04B 2/7416 403/294 |
| 4,761,922 A * | 8/1988 | Black | ........................ | E04B 2/74 160/135 |
| 5,259,164 A * | 11/1993 | Wiese | .................. | E04B 2/7427 160/135 |
| 5,560,413 A * | 10/1996 | Brown | .................. | E04B 2/7425 160/135 |
| 6,598,649 B1 * | 7/2003 | Moore | .................. | E04B 2/7431 160/135 |
| 8,407,855 B2 * | 4/2013 | Gagnon | ................. | A47B 91/00 16/42 R |
| 8,807,356 B2 * | 8/2014 | Weigand | .................... | A47F 5/10 211/183 |
| 8,973,642 B2 * | 3/2015 | Lawson | ................ | E04H 1/1272 160/135 |
| 2005/0000164 A1 * | 1/2005 | Jacobs | ................ | E05D 15/0669 49/425 |
| 2005/0223665 A1 * | 10/2005 | Maas | .................... | E04B 2/7427 52/239 |
| 2008/0272565 A1 * | 11/2008 | Fitzgerald | ................. | A47F 3/06 280/47.35 |
| 2009/0000750 A1 * | 1/2009 | Hardt, II | ............... | E04B 2/7427 160/351 |

FOREIGN PATENT DOCUMENTS

JP        2004-472834        *  6/2004  ............ B60B 33/00

* cited by examiner

*Primary Examiner* — James B Hull
(74) *Attorney, Agent, or Firm* — Richard Eldredge

(57) ABSTRACT

A dry erase board system includes a base hub, having a center stem; wheel bases attached to the center stem; dry erase boards, each of the dry erase boards having a frame; and a front wheel attached to the frame and to be removably secured to one of the wheel bases; the base hub holds the dry erase boards upright.

2 Claims, 6 Drawing Sheets

DRY ERASE BOARD SYSTEM AND METHOD OF USE

BACKGROUND

1. Field of the Invention

The present invention relates generally to dry erase boards, and more specifically, to a mobile dry erase board system for customizing the configuration of multiple dry erase boards.

2. Description of Related Art

Dry erase boards are well known in the art and are effective means to provide a surface for which to write on or project an image. For example, FIG. 1 depicts a conventional dry erase board 101 having a glass surface 103 surrounded on one or more sides by a frame 105 and having one or more wheels 107a, 107b attached to frame 105. During use, surface 103 is written on by a dry erase marker (not shown), or alternatively projected onto by a projector (not shown).

One of the problems commonly associated with board 101 is lack of viewing angles. For example, conventional dry erase boards can only be positioned to face a single direction, therefore making it difficult to view from all angles.

Accordingly, although great strides have been made in the area of dry erase boards, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
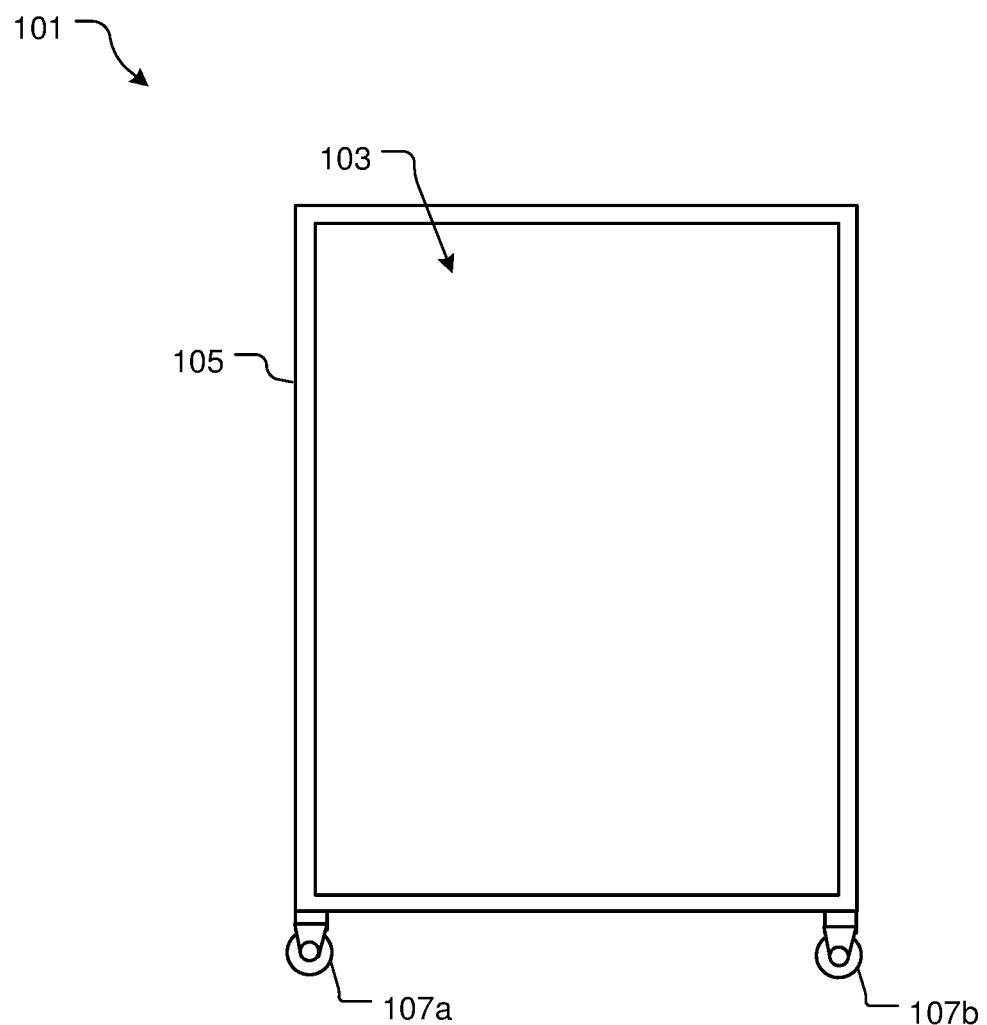
FIG. 1 is a front view of a common dry erase board.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional dry erase boards. Specifically, the present invention provides a means to customize the viewing angles associated with a dry erase board system. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2A:
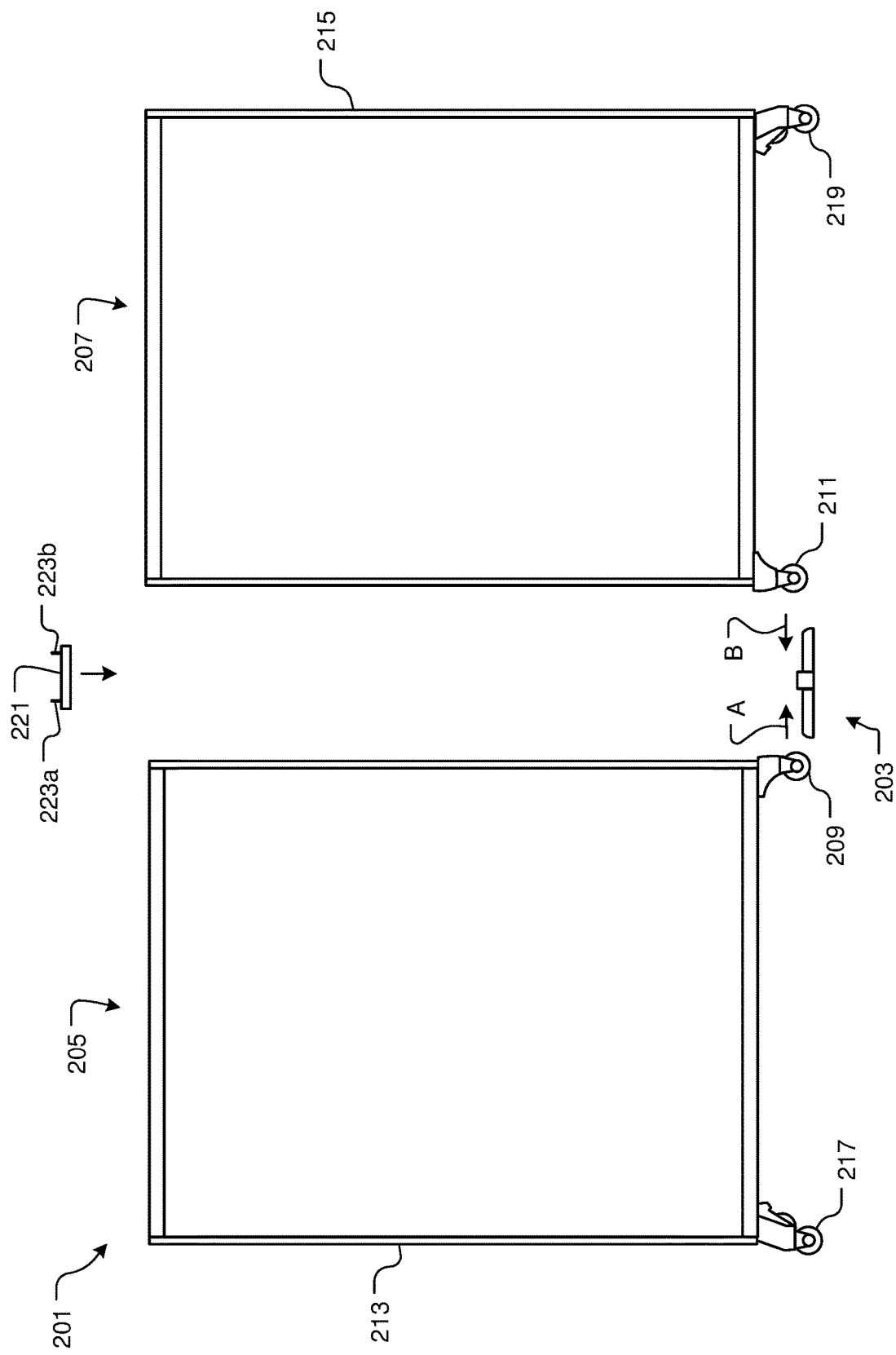
FIGS. 2A and 2B are front views of a mobile dry erase board system in accordance with a preferred embodiment of the present application.
Figure 2B:
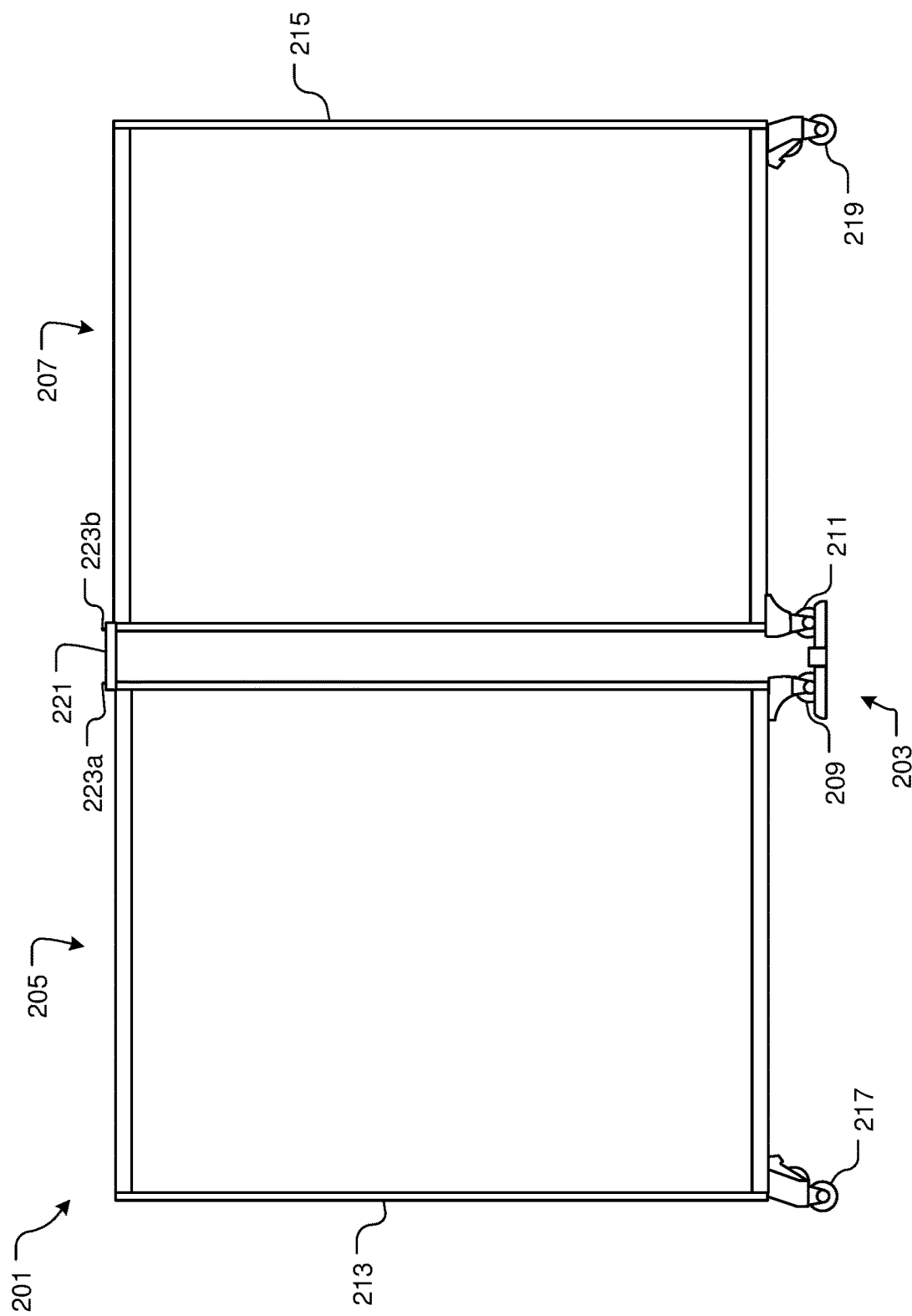

Referring now to the drawings wherein like reference characters identify corresponding or similar elements throughout the several views, FIGS. 2A and 2B depict front views of a dry erase board system 201 in accordance with a preferred embodiment of the present application. It will be appreciated that system 201 overcomes one or more of the above-listed problems commonly associated with conventional dry erase boards.

In the contemplated embodiment, system 201 includes a base hub 203 configured to secure one or more dry erase boards 205, 207 in a configuration via front wheels 209, 211. In the preferred embodiment, dry erase boards 205, 207 include frames 213, 215 and additional wheel units 217, 219 configured to make system 201 mobile.

In the preferred embodiment, wheels 209, 211 slide into hub 203 as indicated with arrows A and B, wherein wheels 209, 211 are limited in movement and retained within hub 203, as shown in FIG. 2B. Boards 205, 207 are further secured in place via a top connector 221, having one or more pins 223a, 223b configured to be inserted into frames 213, 215.

It should be appreciated that one of the unique features believed characteristic of the present application is hub 203. It should be appreciated that hub 203 can be adapted to receive a plurality of dry erase boards, and adapted to hold the plurality of dry erase boards at various angles, thereby allowing for a means to customize the viewing angles of the boards.

Figure 3B:
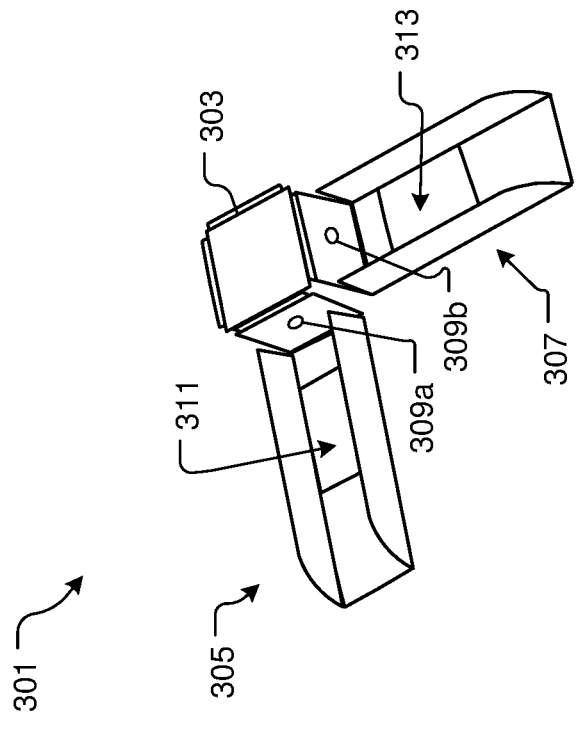
FIGS. 3A and 3B are oblique views of a base hub of FIGS. 2A and 2B.
Figure 3A:
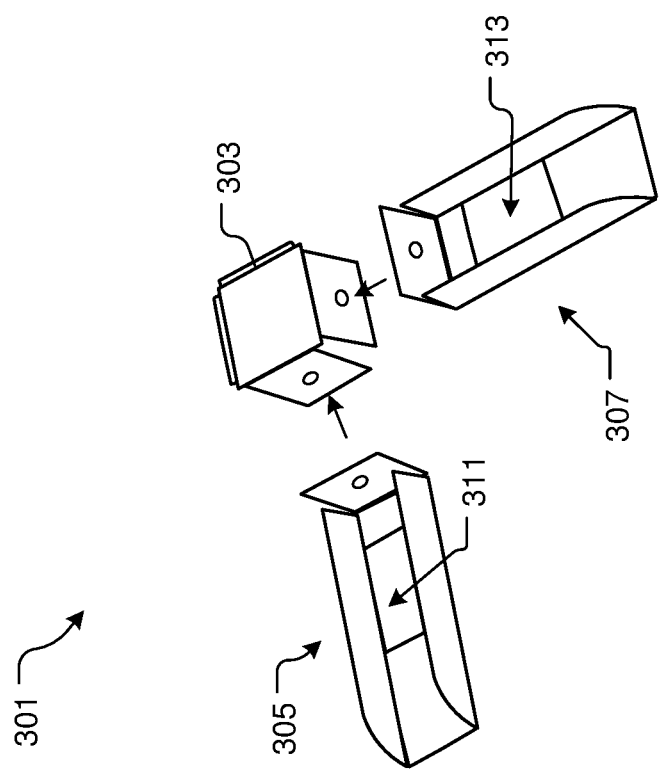

In FIGS. 3A and 3B, oblique views of an exemplary embodiment of a hub 301 for use with system 201 is shown. Hub 301 includes a central stem 303 configured to secure to one or more wheel bases 305, 307. It is contemplated that central stem 303 and wheel bases 305, 307 can be manufactured as one unit, or alternatively, bases 305, 307 can be removable via one or more screws 309a, 309b. Bases 305, 307 can further include cut outs 311, 313 configured to receive wheels and prevent the wheels from disengaging with bases 305, 307. It should be appreciated that cut outs 311, 313 can be sized appropriately to allow slight rotation of the wheels, thereby further allowing for slight manipulation of the angle at which the plurality of boards are positioned.

Figure 5:
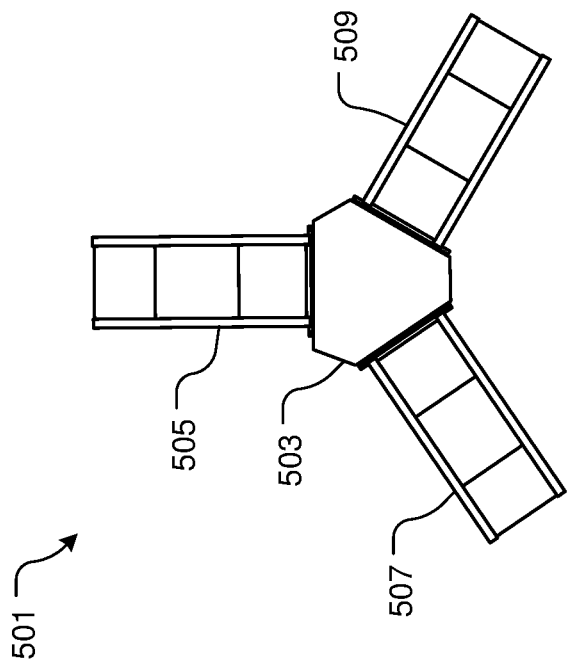
FIG. 5 is a top view of an exemplary embodiment of a base hub of FIGS. 2A and 2B.
Figure 4:
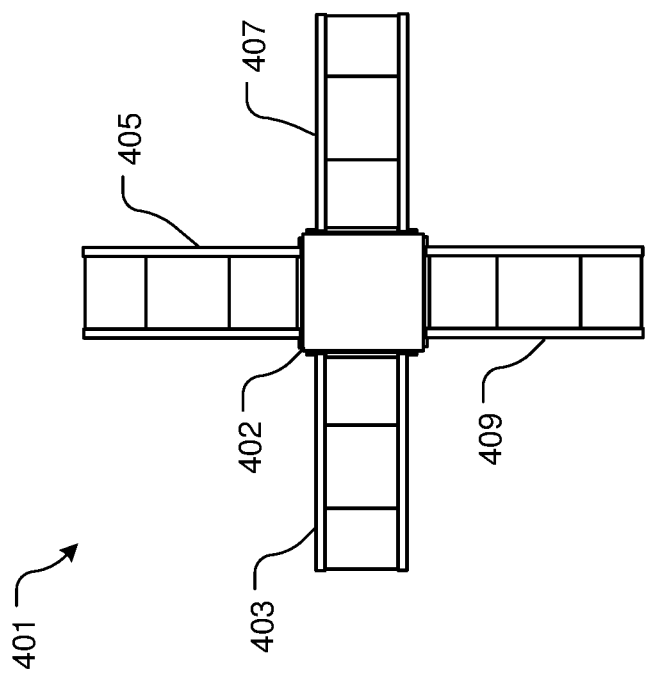
FIG. 4 is a top view of an exemplary embodiment of a base hub of FIGS. 2A and 2B.

In FIGS. 4 and 5, top views of exemplary embodiments of hubs 401, 501 configured to be used with system 201 are shown. It should be appreciated that various hubs can be manufactured in different shapes, thereby allowing for various configurations of dry erase boards around the hubs. For example, as shown in FIG. 4, hub 401 includes a rectangular stem 402 and up to four wheel bases 403, 405, 407, 409, thereby allowing for perpendicular or parallel placement of two or more dry erase boards. As shown in FIG. 5, hub 501 includes a polygon stem 503 configured to position a plurality of wheel bases 505, 507, 509 at angles relative to one another.

Figure 6:
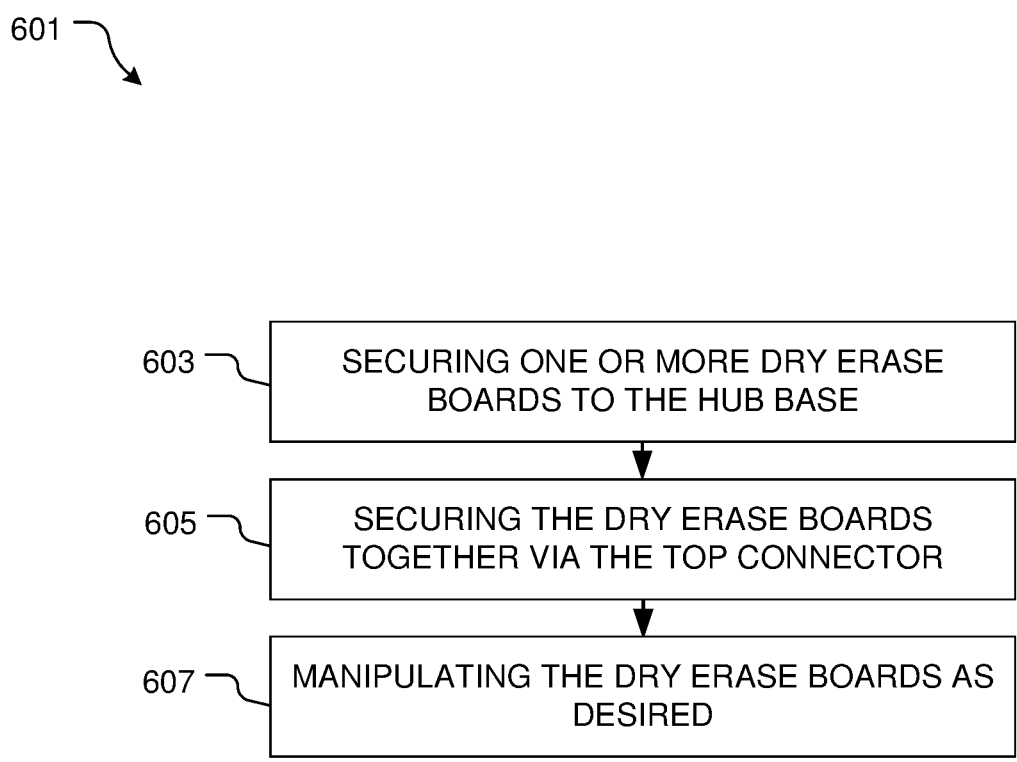
FIG. 6 is a flowchart of the method of FIGS. 2A and 2B.

In FIG. 6, a flowchart depicts the method of use of system 201. During use, one or more dry erase boards are secured to the hub via wheels and wheel bases, as shown with box 603. A top connector is used to further secure the dry erase boards to one another, as shown with box 605. The various dry erase boards can then be manipulated as desired by the user to improve viewing angles, as shown with boxes 607, 609.

It should be appreciated that the dry erase boards associated with system 201 can be glass or any other material capable of providing a surface to be written on and later erased. In addition, it should be appreciated that the various components of system 201 can vary in size and material as aesthetical, functional, or manufacturing considerations require.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A dry erase board system, comprising:
   a first board having:
      a first frame with a first top section and a first bottom section; and
      a first wheel secured to the first bottom section;
   a second board having:
      a second frame with a second top section and a second bottom section; and
      a second wheel secured to the second bottom section;
   a top connector, having:
      an elongated body configured to removably engage with the first top surface and the second top surface;
      a first pin secured to the elongated body;
      a second pin secured to the elongated body, the first pin and the second pin are configured to engage with the first top surface and the second top surface;
   a base hub, having:
      a center stem;
      a first wheel base forming a first channel configured to receive the first wheel, the first wheel base having a tab configured to engage with the center stem;
      a second wheel base forming a second channel configured to receive the second wheel, the second wheel base having a tab configured to engage with the center stem;
      a first screw configured to secure the first wheel base to the center stem; and
      a second screw configured to secure the second wheel base to the center stem.

2. The system of claim 1, wherein the first board and the second board are composed of glass.

* * * * *